(12) United States Patent
Khan et al.

(10) Patent No.: US 11,640,326 B2
(45) Date of Patent: May 2, 2023

(54) ENSEMBLE BASED CLUSTER TUNING AND FRAMEWORK FALLBACK FOR AI ACCELERATORS USING TELEMETRY, COMPUTE, AND TEMPERATURE METRICS

(71) Applicant: Intel Corporation, Santa Clara, CA (US)

(72) Inventors: N Maajid Khan, Bengaluru (IN); Yamini Nimmagadda, Portland, OR (US); Surya Siddharth Pemmaraju, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/392,917

(22) Filed: Aug. 3, 2021

(65) Prior Publication Data
US 2021/0365304 A1    Nov. 25, 2021

(51) Int. Cl.
| G06F 3/00 | (2006.01) |
| G06F 9/54 | (2006.01) |
| G06K 9/62 | (2022.01) |
| G06N 3/02 | (2006.01) |
| G06F 9/50 | (2006.01) |

(52) U.S. Cl.
CPC .............. *G06F 9/54* (2013.01); *G06F 9/5027* (2013.01); *G06K 9/6224* (2013.01); *G06N 3/02* (2013.01)

(58) Field of Classification Search
CPC .................................... G06F 9/54; G06N 3/02
See application file for complete search history.

(56) References Cited

U.S. PATENT DOCUMENTS

| 2019/0392831 A1* | 12/2019 | Pohl ................... H04N 5/23212 |
| 2020/0191643 A1* | 6/2020 | Davis ....................... G01H 1/00 |
| 2021/0056384 A1* | 2/2021 | Ko ........................... G06F 30/27 |
| 2021/0122398 A1* | 4/2021 | Kim ..................... G05D 1/0038 |
| 2021/0166381 A1* | 6/2021 | Yip ............................. G06T 1/20 |
| 2021/0173666 A1* | 6/2021 | Cheng .................... G06F 9/545 |
| 2021/0390047 A1* | 12/2021 | Cheng .................... G06N 20/00 |

FOREIGN PATENT DOCUMENTS

| CN | 111695443 A * | 9/2020 | ......... G06K 9/00771 |
| KP | 20190104267 A * | 9/2019 | |
| WO | WO-2021006405 A1 * | 1/2021 | ........... G06N 3/0454 |

OTHER PUBLICATIONS

Can Tang, An Improved Algorithm for Tor Circuit Scheduling. (Year: 2010).*
Gulshan Kumar, The use of artificial intelligence based techniques for intrusion detection: a review. (Year: 2010).*

* cited by examiner

*Primary Examiner* — Lechi Truong
(74) *Attorney, Agent, or Firm* — Jordan IP Law, LLC

(57) ABSTRACT

Systems, apparatuses and methods may provide for technology that identifies telemetry data associated with an execution of a cluster of artificial intelligence (AI) operations on an accelerated backend system, wherein the telemetry data includes one or more of temperature classifier data, compute classifier data or failure data, and determines whether to send a current instance of the cluster of AI operations to the accelerated backend system or a default backend system based on the telemetry data.

16 Claims, 8 Drawing Sheets

ENSEMBLE BASED CLUSTER TUNING AND FRAMEWORK FALLBACK FOR AI ACCELERATORS USING TELEMETRY, COMPUTE, AND TEMPERATURE METRICS

CROSS-REFERENCE TO RELATED APPLICATIONS

The present application claims the benefit of priority to Indian Provisional Patent Application No. 202141026107, filed Jun. 11, 2021.

TECHNICAL FIELD

This disclosure relates generally to artificial intelligence (AI). More particularly, this disclosure relates to ensemble based cluster tuning and framework fallback for AI accelerators using telemetry, compute, and temperature metrics.

BACKGROUND OF THE DISCLOSURE

Many deep learning frameworks such as TENSORFLOW, PYTORCH, ONNX RUNTIME, PADDLEPADDLE and others may work with different hardware (HW) acceleration libraries to execute the deep learning models on the hardware platform. Each framework may support an extensible interface that would help to integrate with the HW specific libraries. This interface may provide flexibility for application developers to deploy models in different environments in the cloud and the edge and optimize the execution of artificial intelligence (AI) models by taking advantage of the compute capabilities of the platform. These frameworks can work with execution providers (EPs), which have the interface to allocate specific nodes or subgraphs in an AI model for execution by the EP library in supported hardware. The EP libraries that are pre-installed in the execution environment process and execute the subgraph of the model on the hardware. This architecture may abstract out the details of the hardware specific libraries that optimize the execution of deep neural networks across hardware platforms such as a central processing unit (CPU), graphics processing unit (GPU), field-programmable gate array (FPGA) or specialized application specific integrated circuit (ASIC).

A single framework today may be integrated with many other accelerated backend systems ("backends") for faster inferencing. For example, the ONNX Runtime package from MICROSOFT may be built with any combination of the execution provider along with a default CPU execution provider. The TENSORRT execution provider in the ONNX Runtime makes use of the TENSORRT Deep Learning inferencing engine from NVIDIA to accelerate the ONNX model in a family of GPUs. Similarly, the OPENVINO execution provider enables deep learning inference on CPUs, integrated GPUs and Vision Processing Units (VPUs) from INTEL. Framework integration of backends enables unsupported operators or a cluster of operators to be run on default runtimes and the rest of the supported graph to be run on an accelerated backend. If some operators in the model are not supported by an accelerated backend, then the corresponding deep learning framework may partition the graph and only send supported subgraphs to the accelerated backend, with the unsupported subgraphs falling back to the default backend from the framework. Compute and memory requirements may often be estimated using heuristics, with clusters being executed either on the accelerated backend or the framework runtime. The estimation, however, is not always accurate, resulting in runtime failures and lower inference performance.

BRIEF DESCRIPTION OF THE DRAWINGS

So that the manner in which the features of the present embodiments can be understood in detail, a more particular description of the embodiments may be had by reference to embodiments in the following detailed description, some of which are illustrated in the appended drawings. It is to be noted, however, that the appended drawings illustrate only typical embodiments and are therefore not to be considered limiting of its scope.

DETAILED DESCRIPTION

Figure 1:
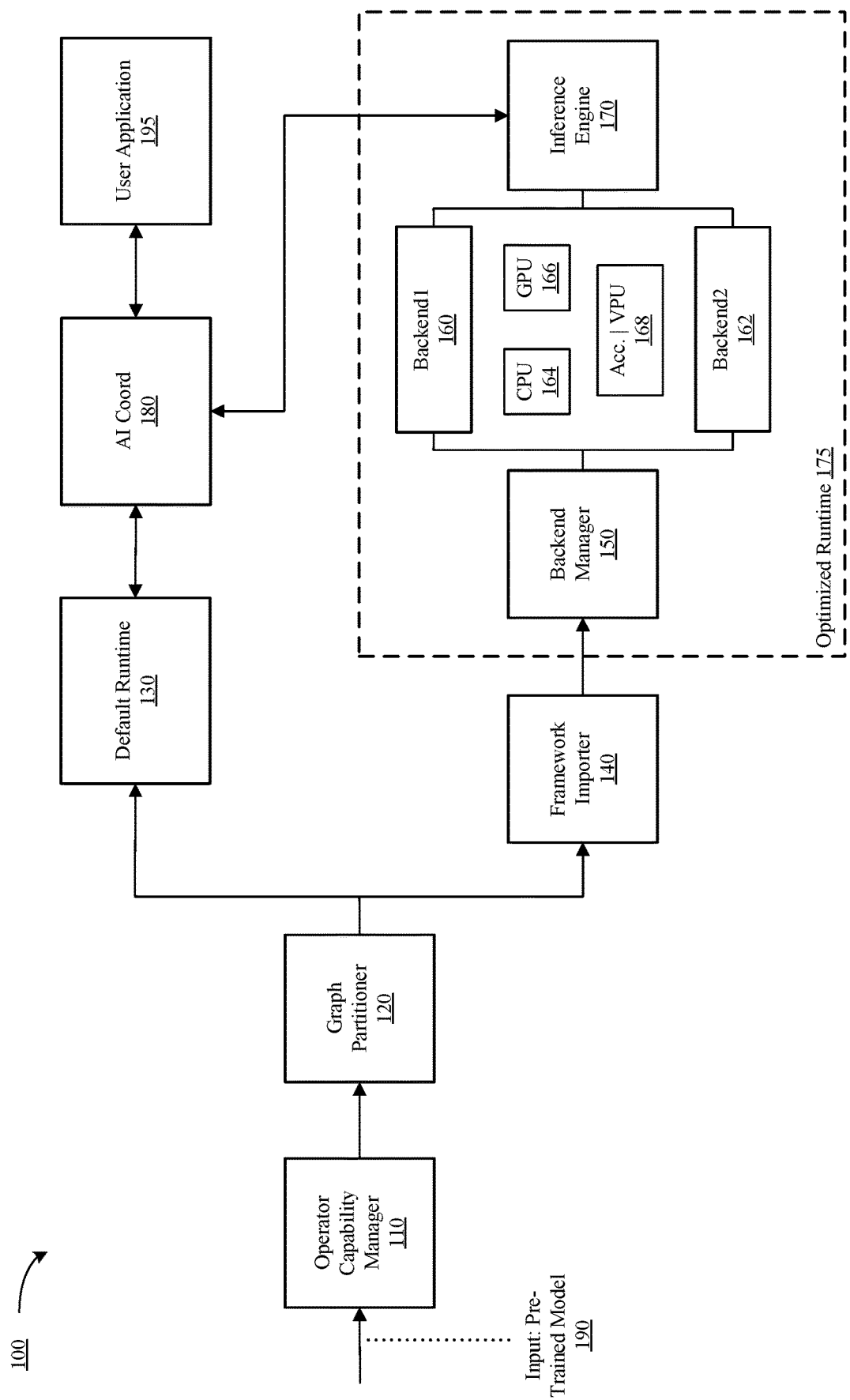
FIG. 1 is a block diagram of an example of an AI framework integration system according to an embodiment.

FIG. 1 provides a block diagram illustrating an example of an artificial intelligence (AI) framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a central processing unit (CPU) 164, a graphics processing unit (GPU) 166, and a hardware accelerator such as a vision processing unit (VPU) 168 (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 can be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g., mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types, and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime 130.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, (e.g., the first backend 160 or the second backend 162). In some embodiments, the first backend 160 represents a basic backend that is optimized for a particular group of hardware units. For example, where the optimized runtime 175 utilizes the Open Visual Inference and Neural network Optimization (OpenVINO) runtime technology, the first backend 160 can be the OpenVINO backend. In some embodiments, the second backend 162 can be a backend such as VAD-M, which is optimized for machine vision tasks using a VPU such as the Intel® Myriad X VPU. The selected backend compiles (via a compiler) supported subgraphs into executable code and performs optimization. The backend manager 150 also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175. As will be discussed in greater detail, the system 100 automatically determines whether to send a current instance of a cluster of AI operations (e.g., pre-trained model subgraph) to the optimized runtime 175 or the default runtime 130 based on telemetry data (e.g., temperature classifier data, compute classifier data, failure data, etc.).

An operating temperature is the temperature at which an electrical or mechanical device operates. The device will operate effectively within a specified temperature range that varies based on the device function and application context, and ranges from the minimum operating temperature to the maximum operating temperature (or peak operating temperature). Outside this range of safe operating temperatures, the device may fail. Efficient subgraph partitioning and cluster tuning techniques may be used today to offload some of the graph nodes from the accelerated backend to other hardware targets such as a GPU, CPU, etc.

When a cluster is supported on an accelerated backend, however, the cluster is traditionally defaulted to run on the accelerated backend and it is assumed that an accelerated backend will provide better performance for the cluster (e.g., ONNX Runtime Execution providers). It does not always necessarily mean that a cluster when run on an accelerated backend will yield better performance. This factor varies with the machine configuration, machine versions and many other factors.

When a cluster is made to run on an accelerated backend, it is always assumed that the cluster does not fail there and runs successfully at the runtime. This assumption is not true, however, because there may be scenarios where a cluster fails to run on an accelerated backend during runtime due to unexpected memory limitations or unsupported operator patterns.

Conventional solutions do not learn from telemetry or use temperature as a deciding factor while graph partitioning. Accordingly, the solutions might attempt to overload the accelerator with the workload, which may lead to performance issues, failures and impact the longevity of the accelerator.

Very few techniques may use some advanced metrics such as compute metrics as a factor while partitioning graphs. Moreover, metrics such as telemetry and temperature are typically not used.

Embodiments use metrics such as telemetry, temperature, compute to resolve failures that may occur while running a portion of the graph on an accelerated backend and also improve the overall performance of the model while ensuring that the accelerator is not encountering heat issues that would have an impact on the performance of the accelerator.

Embodiments use an "ensemble" solution that automatically identifies the best combination of factors such as telemetry, temperature, and compute to make the decision for cluster tuning of a graph.

Embodiments have the following advantages:

Prevent inference failures at run time and improve model performance.

Help the development team to learn more about the new models with the help of inhouse telemetry and provide early insights to prioritize the fixes for the failures.

Improve the longevity of silicon by reducing the workload burden when the silicon is operating at the higher temperatures.

Embodiments solve the issues as specified in the previous sections by using an ensemble based subgraph partitioning solution based on metrics such as telemetry, compute and temperature.

Figure 2A:
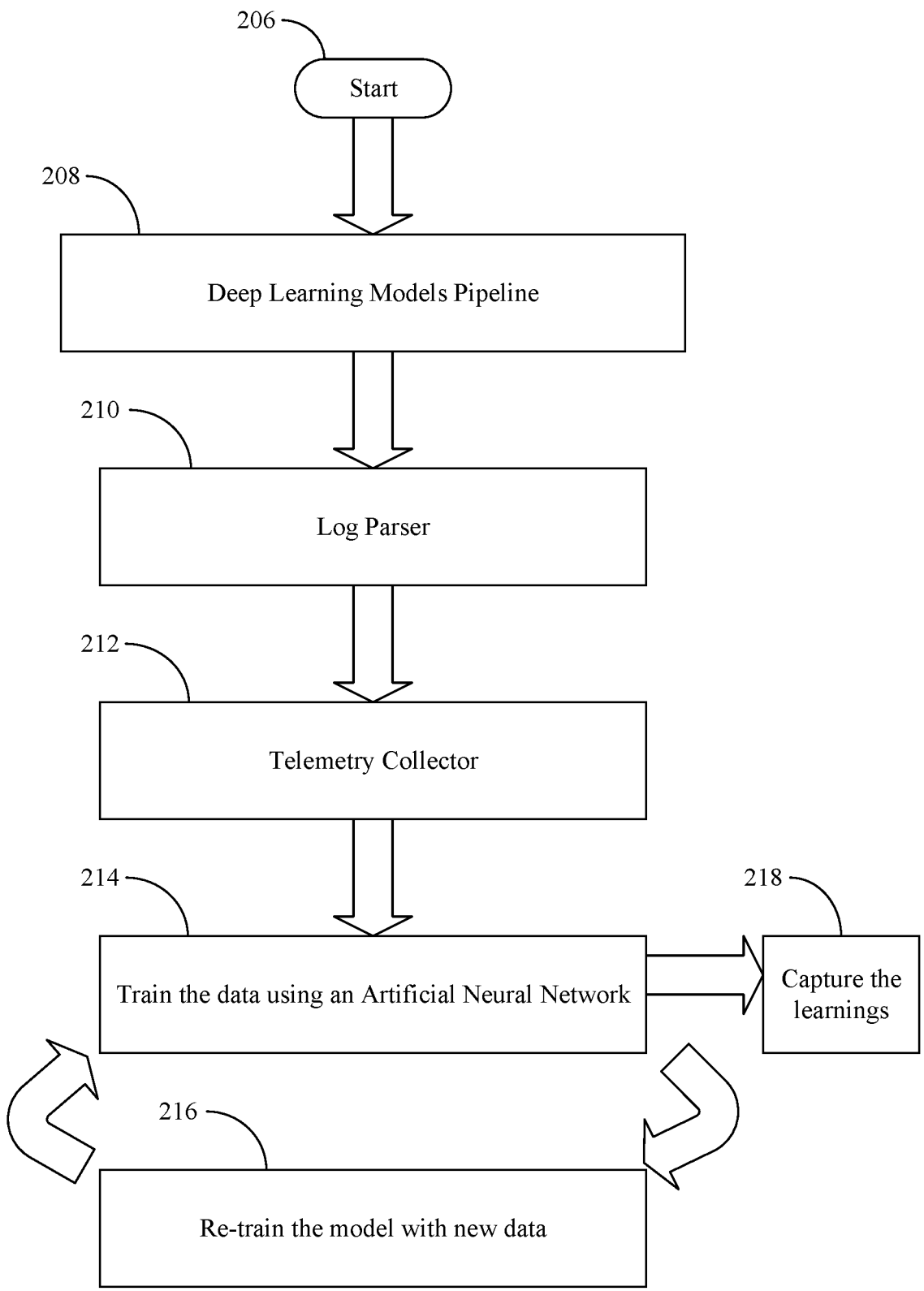
FIG. 2A is an illustration of an example of a telemetry process flow according to an embodiment.
Figure 2B:
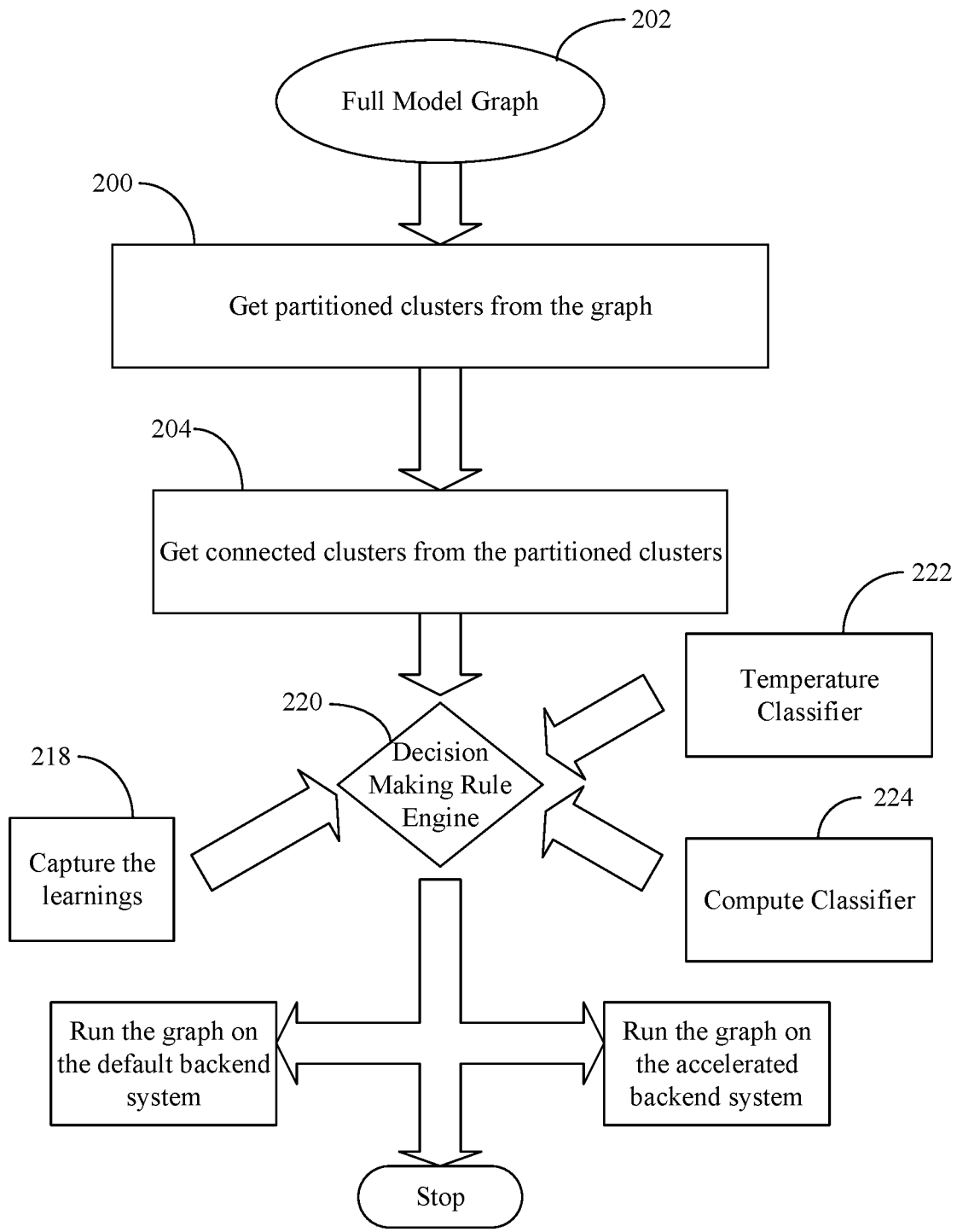
FIG. 2B is an illustration of an example of a decision making process flow according to an embodiment.

Turning now to FIGS. 2A and 2B, a process block 200 obtains partitioned clusters from a full graph 202. The full graph is topologically sorted first. Wherever there is an unsupported node in the sorted graph, the unsupported node is used as a basis to divide the graph into two subgraphs or clusters. Block 200 repeats this process at each unsupported node to obtain multiple subgraphs that are supported on the accelerated backend. Process block 204 obtains all connected clusters from the set of already partitioned clusters.

As best shown in FIG. 2A, process block 206 starts telemetry processing, which applies past telemetry knowledge from the logs on the connected clusters. More particularly, a pipeline 208 is run for all available or supported deep learning models. Graph performance information and runtime failures is captured from the logs. A log parser 210 parses the logs to generate training data. A telemetry collector 212 generates and stores all of the data after preprocessing. Process block 214 sends the data for training using an Artificial Neural Network (ANN). This operation occurs in a loop and in a continuous manner where the initial model is re-trained at process block 216 each time new data is generated. Accordingly, the model fits with respect to new data and is up to date with the new patterns. Accordingly, the model weights keep getting updated in a timely manner. Process block 218 captures the learnings from the insights generated using the prediction from the ANN. As best shown in FIG. 2B, the learnings are sent to a decision making rule engine 220 (e.g., including logic instructions, configurable logic, fixed-functionality hardware logic, etc., or any combination thereof). The decision making rule engine 220 obtains decision metrics from a temperature classifier component 222 and a compute classifier component 224.

Figure 3:
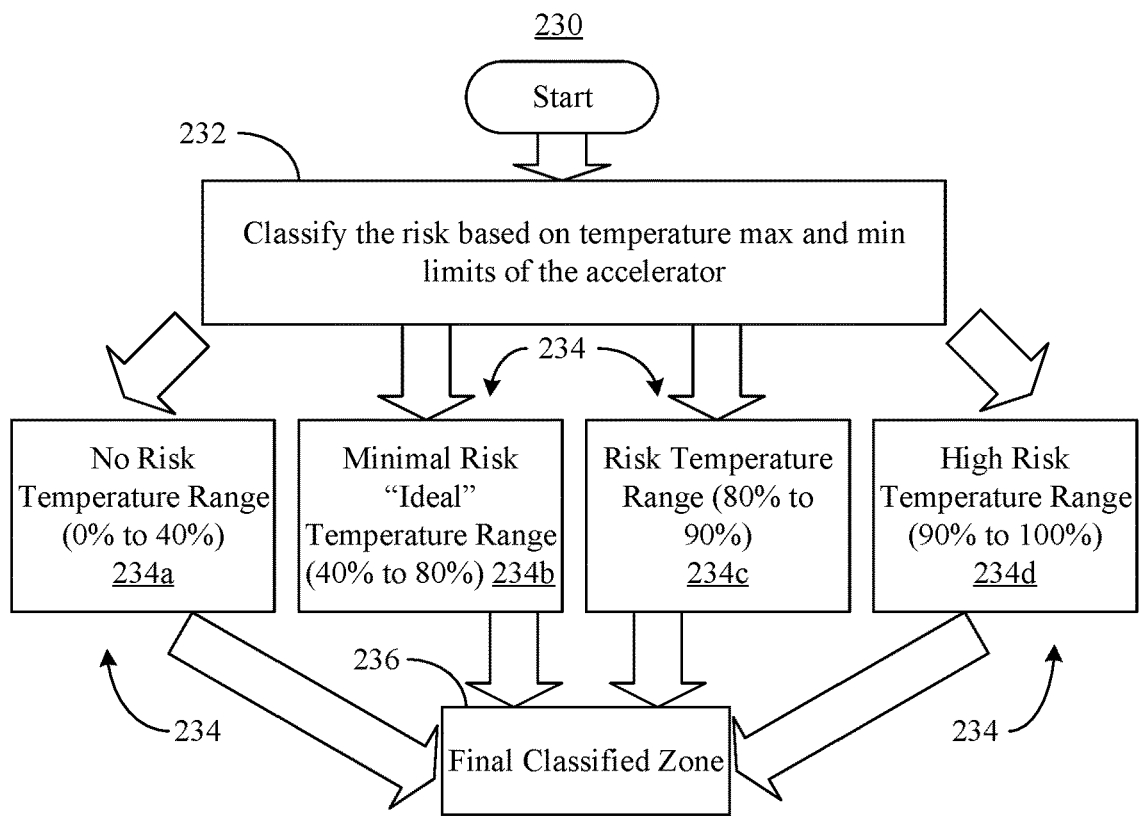
FIG. 3 is a block diagram of an example of a temperature classifier according to an embodiment.

FIG. 3 demonstrates the operation of a temperature classifier component 230 that may be readily substituted for the temperature classifier component 222 (FIG. 2B), already discussed. In particular, process block 232 classifies the risk based on temperature maximum and minimum limits of the accelerator. In the illustrated example, the cluster of AI operations is assigned one of a plurality of temperature classifiers 234 (234a-234d). Using the current temperature of the accelerator, a final classified zone 236 is selected for the accelerator.

Figure 4:
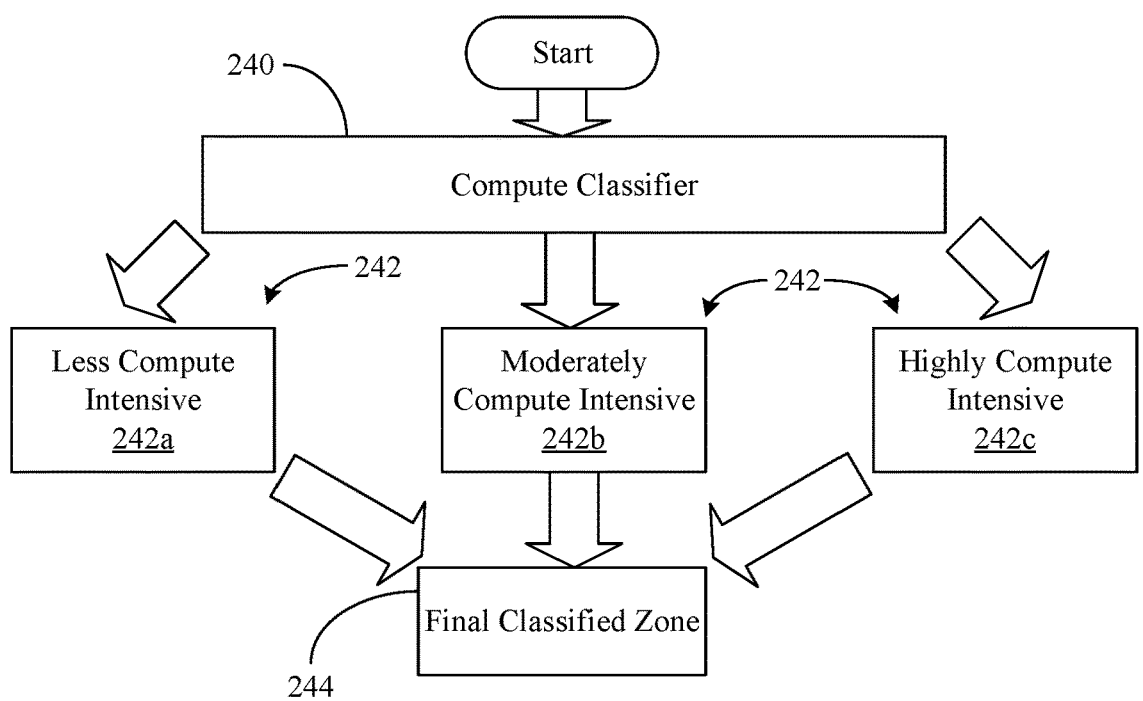
FIG. 4 is a block diagram of an example of a compute classifier according to an embodiment.

FIG. 4 shows a compute classifier component 240 that may be readily substituted for the compute classifier component 224 (FIG. 2B), already discussed. The illustrated compute classifier component 240 takes each cluster and obtains the compute intensity level. For example, the compute classifier component 240 may select from a plurality of intensities 242 (242a-242c). Using the selected intensity 242, a final classified zone 244 is selected for the accelerator. With continuing reference to FIGS. 2B, 3 and 4, both the final classified zone 236 and the final classified zone 244 are sent to the decision making rule engine 220.

The learnings and results from the classifier components 222, 224 are used by the decision making rule engine 220 to automatically select a backend for the subgraph. The below pseudocode shows one example of the operation of the decision making rule engine 220.

```
FOR (Each cluster in connected cluster's):
    IF (cluster performance on default backend > accelerated backend) OR
        (cluster failed on accelerated backend) OR
        (Temperature zone == High Risk):
            Run or Infer the cluster using the default backend.
    ELSE if (Temperature zone == Risk AND compute Level == Medium)
    OR
        (Temperature zone == Risk AND compute Level == Low):
            Run or Infer the cluster using the default backend.
    ELSE:
        Run or Infer the cluster using the accelerated backend.
```

Thus, not only is the decision making rule engine 220 able to make use of new telemetry data such as temperature classifier data, the illustrated decision making rule engine 220 combines the temperature classifier data with other telemetry data such as compute classifier data to obtain an ensemble solution that outperforms conventional approaches. The subgraph now runs on the backend that best serves the subgraph with respect to performance and the success rate of the subgraph (e.g., not failing during runtime), while also ensuring that the accelerator does not encounter excessive heat issues.

Figure 5:
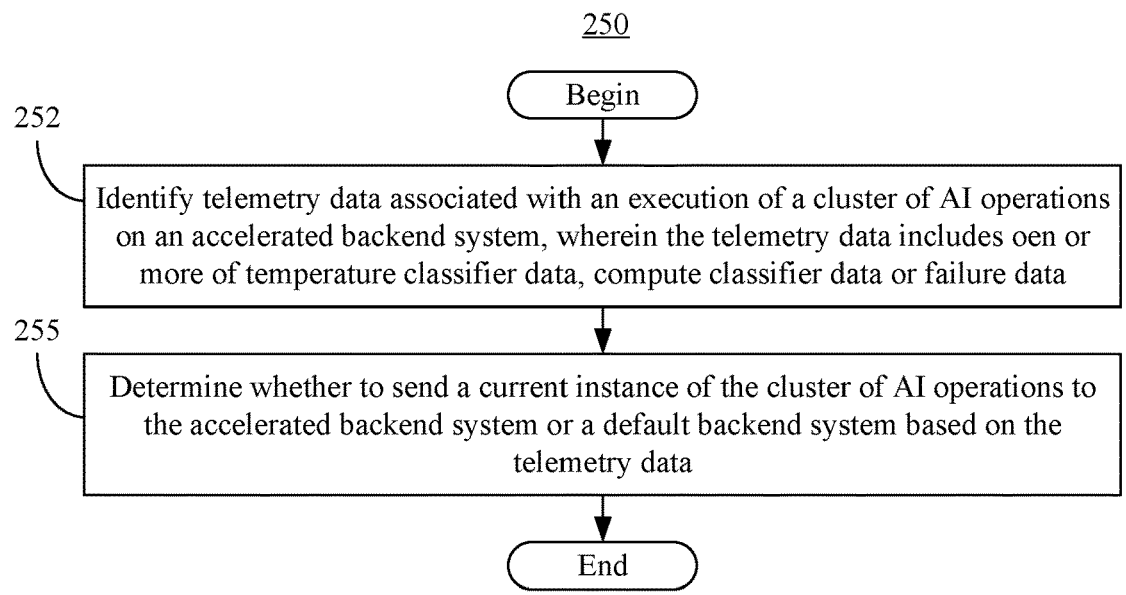
FIGS. 5 and 6 are flowcharts of examples of methods of operating a performance-enhanced computing architecture according to an embodiment.

FIG. 5 is a flowchart of an example of a method 250 of operating a performance-enhanced computing architecture. The method 250 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable hardware such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 250 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 252 identifies telemetry data associated with an execution of a cluster of AI operations (e.g., pre-trained model subgraph) on an accelerated backend system, wherein the telemetry data includes one or more of temperature classifier data, compute classifier data or failure data. In an embodiment, the compute classifier data indicates a level of computational intensity corresponding to one or more previous instances of the cluster of AI operations on the accelerated backend system. Additionally, the temperature classifier data may indicate a risk range/zone corresponding to one or more previous instances of the cluster of AI operations on the accelerated backend system. In one example, the failure data also corresponds to one or more previous instances of the cluster of AI operations on the accelerated backend system. Block 255 determines whether to send a current instance of the cluster of AI operations to the accelerated backend system or a default backend system based on the telemetry data.

The method 250 therefore enhances performance at least to the extent that using telemetry data to determine which backend to use prevents inference failures at runtime. The method 250 also helps development teams learn more about new models and provides early insights to prioritize fixes. Additionally, the method 250 improves the longevity of silicon by reducing the workload burden when the silicon is operating at relatively high temperatures.

Figure 6:
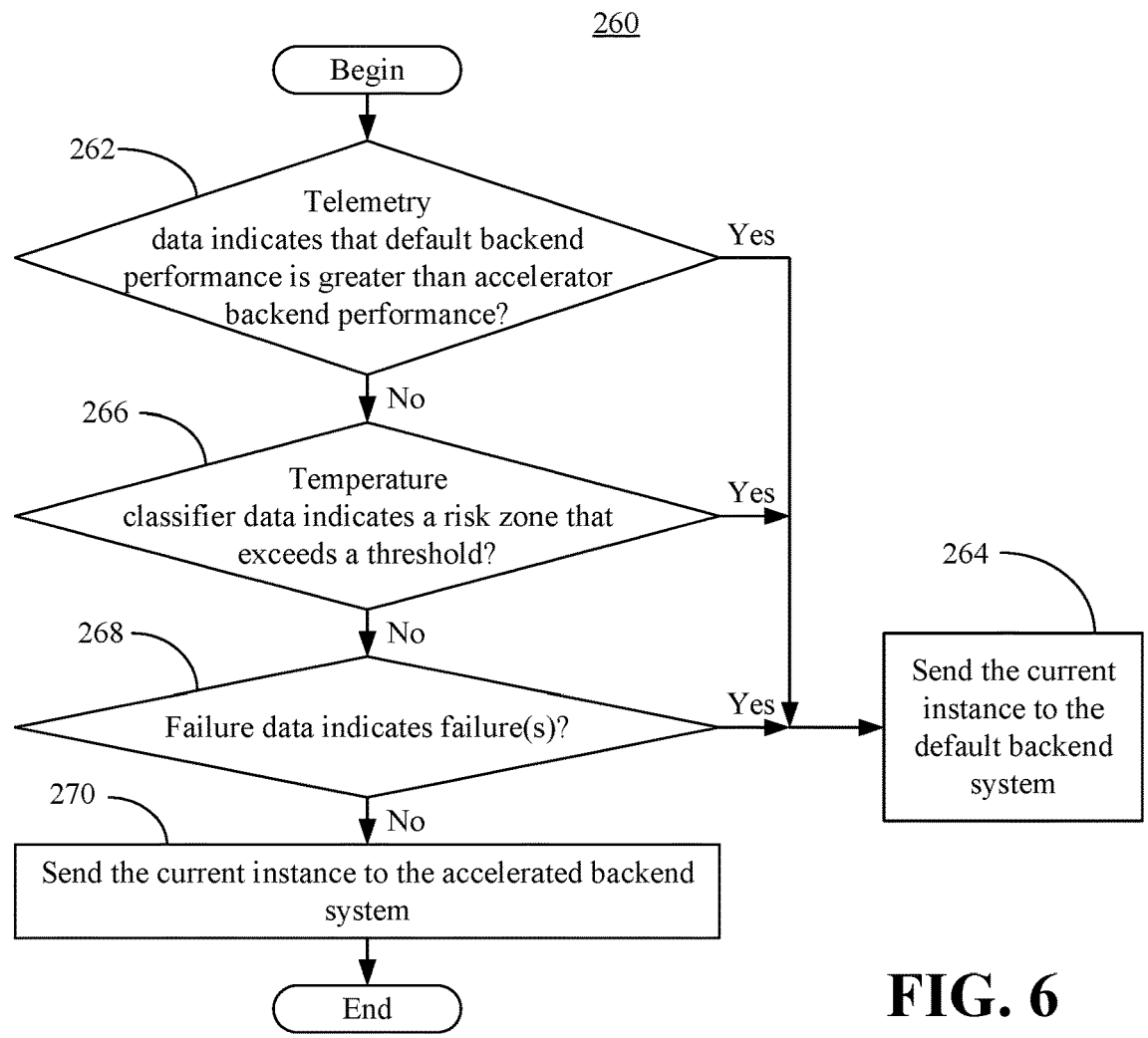

FIG. 6 is a flowchart of an example of another method 260 of operating a performance-enhanced computing architecture. The method 260 may be implemented as one or more modules in a set of logic instructions stored in a non-transitory machine- or computer-readable storage medium such as RAM, ROM, PROM, firmware, flash memory, etc., in configurable hardware such as, for example, PLAs, FPGAs, CPLDs, in fixed-functionality hardware using circuit technology such as, for example, ASIC, CMOS or TTL technology, or any combination thereof.

Illustrated processing block 262 determines whether the telemetry data indicates that the performance of one or more previous instances of the cluster of AI operations on the default backend system is greater than the performance of one or more previous instances of the cluster of AI operations on the accelerated backend system. If so, block 264 sends the current instance to the default backend system.

Block 266 determines whether the temperature risk zone exceeds a threshold (e.g., High Risk temperature zone or Risk temperature zone combined with low to medium compute intensity). If so, block 264 sends the current instance to the default backend system. Block 268 determines whether the failure data indicates one or more failures in the accelerated backend system. If so, block 264 sends the current instance to the default backend system. Otherwise, block 270 sends the current instance to the accelerated backend system. The method 250 therefore further enhances performance at least to the extent that automatically learning performance, temperature and/or failure problems facilitates more efficient deployments of subgraphs in the future.

Figure 7:
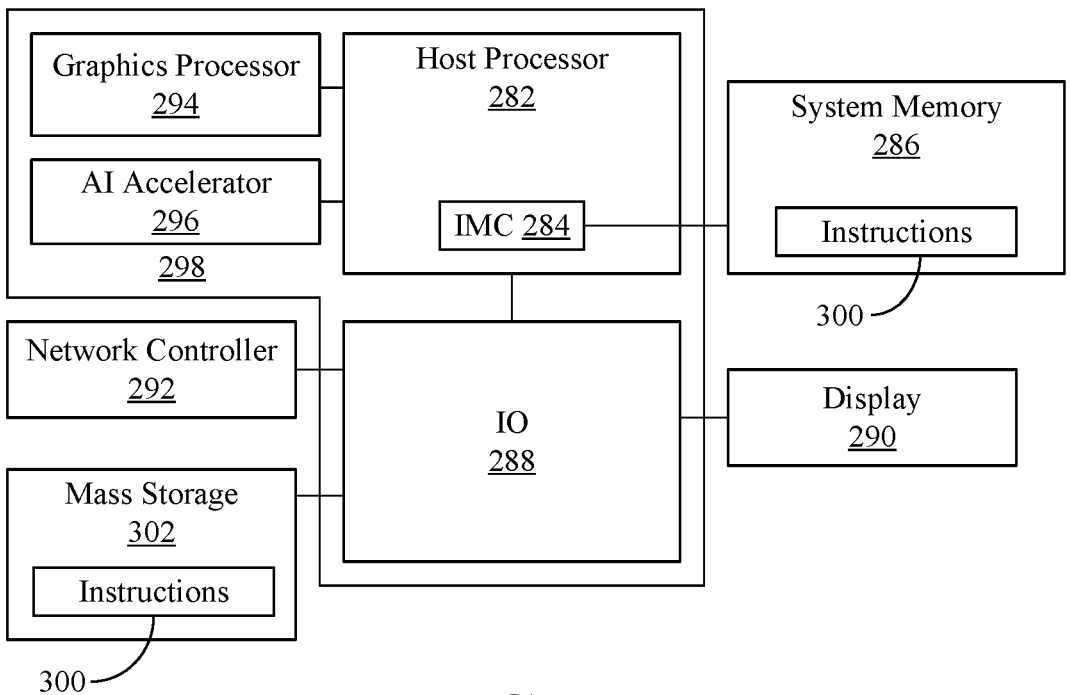
FIG. 7 is a block diagram of an example of a performance-enhanced computing architecture according to an embodiment.

Turning now to FIG. 7, a performance-enhanced computing architecture 280 is shown. The architecture 280 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the architecture 280 includes a host processor 282 (e.g., CPU) having an integrated memory controller (IMC) 284 that is coupled to a system memory 286 (e.g., dual inline memory module/DIM M). In an embodiment, an IO module 288 is coupled to the host processor 282. The illustrated IO module 288 communicates with, for example, a display 290 (e.g., touch screen, liquid crystal display/LCD, light emitting diode/LED display), and a network controller 292 (e.g., wired and/or wireless). The host processor 282 may be combined with the IO module 288, a graphics processor 294 (e.g., default backend system) and an AI accelerator 296 (e.g., accelerated backend system) into a system on chip (SoC) 298.

In an embodiment, the host processor 282 executes a set of program instructions 300 retrieved from mass storage 302 and/or the system memory 286 to perform one or more aspects of the method 250 (FIG. 5) and/or the method 260 (FIG. 6), already discussed. Thus, execution of the illustrated instructions 300 by the host processor 282 causes the host processor 282 to identify telemetry data associated with an execution of a cluster of AI operations (e.g., pre-trained model subgraph) on the AI accelerator 296, wherein the telemetry data includes one or more of temperature classifier data, compute classifier data or failure data. Execution of the illustrated instructions 300 also causes the host processor 282 to automatically determine whether to send a current instance of the cluster of AI operations to the AI accelerator 296 or the graphics processor 294 based on the telemetry data.

The computing architecture 280 is therefore considered performance-enhanced at least to the extent that using telemetry data to determine which backend to use prevents inference failures at runtime. The architecture 280 also helps development teams learn more about new models and provides early insights to prioritize fixes. Additionally, the architecture 280 improves the longevity of silicon by reducing the workload burden when the silicon is operating at relatively high temperatures.

Figure 8:
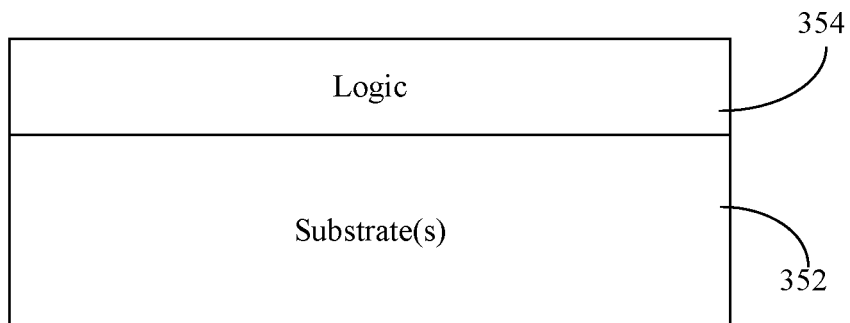
FIG. 8 is an illustration of an example of a semiconductor package apparatus according to an embodiment.

FIG. 8 shows a semiconductor apparatus 350 (e.g., chip, die, package). The illustrated apparatus 350 includes one or more substrates 352 (e.g., silicon, sapphire, gallium arsenide) and logic 354 (e.g., transistor array and other integrated circuit/IC components) coupled to the substrate(s) 352. In an embodiment, the logic 354 implements one or more aspects of the method 250 (FIG. 5) and/or the method 260 (FIG. 6), already discussed.

The logic 354 may be implemented at least partly in configurable logic or fixed-functionality hardware logic. In one example, the logic 354 includes transistor channel regions that are positioned (e.g., embedded) within the substrate(s) 352. Thus, the interface between the logic 354 and the substrate(s) 352 may not be an abrupt junction. The logic 354 may also be considered to include an epitaxial layer that is grown on an initial wafer of the substrate(s) 352.

Figure 9:
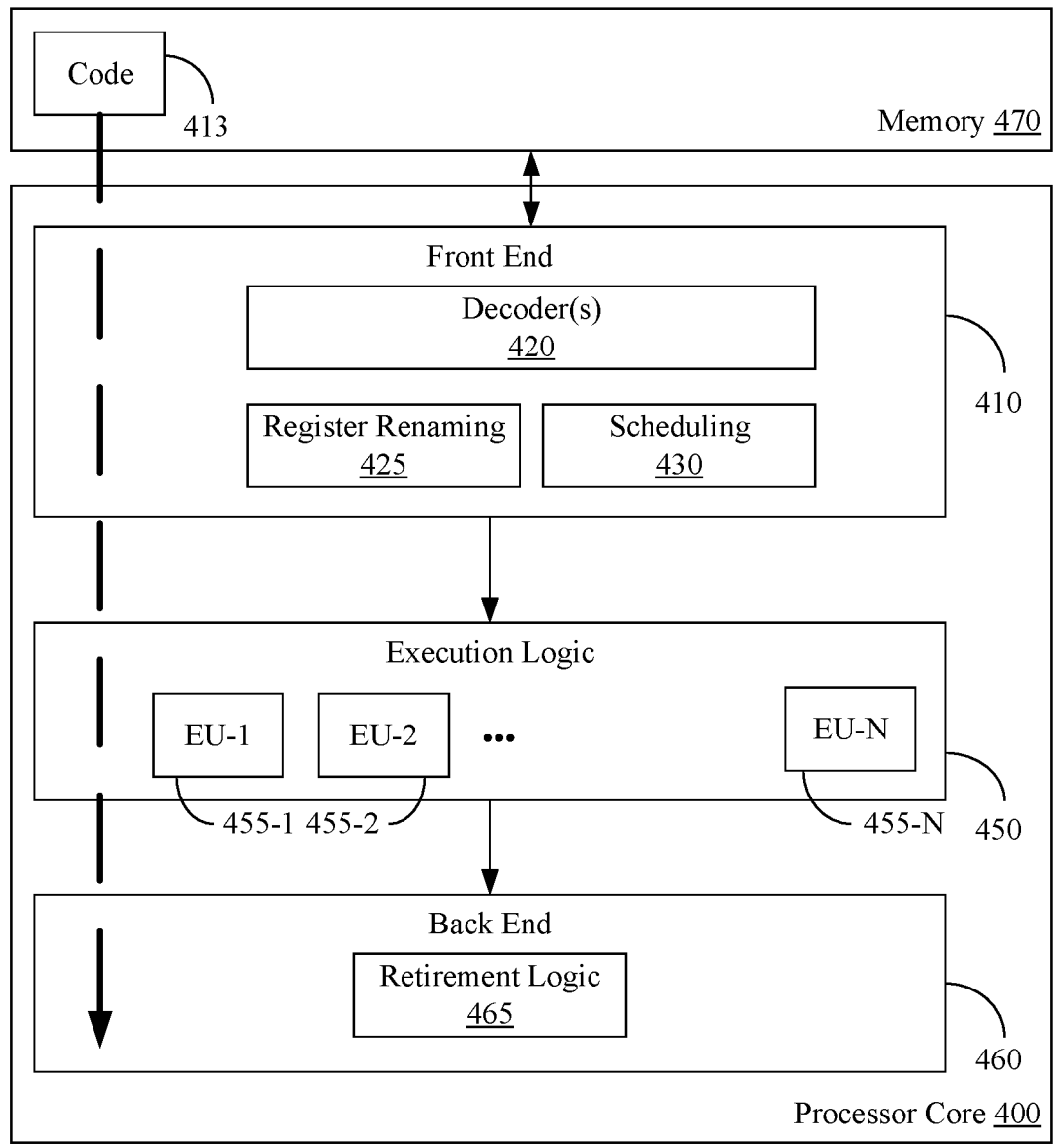
FIG. 9 is a block diagram of an example of a processor according to an embodiment.

FIG. 9 illustrates a processor core 400 according to one embodiment. The processor core 400 may be the core for any type of processor, such as a micro-processor, an embedded processor, a digital signal processor (DSP), a network processor, or other device to execute code. Although only one processor core 400 is illustrated in FIG. 9, a processing element may alternatively include more than one of the processor core 400 illustrated in FIG. 9. The processor core 400 may be a single-threaded core or, for at least one embodiment, the processor core 400 may be multithreaded in that it may include more than one hardware thread context (or "logical processor") per core.

FIG. 9 also illustrates a memory 470 coupled to the processor core 400. The memory 470 may be any of a wide variety of memories (including various layers of memory hierarchy) as are known or otherwise available to those of skill in the art. The memory 470 may include one or more code 413 instruction(s) to be executed by the processor core 400, wherein the code 413 may implement the method 250 (FIG. 5) and/or the method 260 (FIG. 6), already discussed. The processor core 400 follows a program sequence of instructions indicated by the code 413. Each instruction may enter a front end portion 410 and be processed by one or more decoders 420. The decoder 420 may generate as its output a micro operation such as a fixed width micro operation in a predefined format, or may generate other instructions, microinstructions, or control signals which reflect the original code instruction. The illustrated front end portion 410 also includes register renaming logic 425 and scheduling logic 430, which generally allocate resources and queue the operation corresponding to the convert instruction for execution.

The processor core 400 is shown including execution logic 450 having a set of execution units 455-1 through 455-N. Some embodiments may include a number of execution units dedicated to specific functions or sets of functions. Other embodiments may include only one execution unit or one execution unit that can perform a particular function. The illustrated execution logic 450 performs the operations specified by code instructions.

After completion of execution of the operations specified by the code instructions, back end logic 460 retires the instructions of the code 413. In one embodiment, the processor core 400 allows out of order execution but requires in order retirement of instructions. Retirement logic 465 may take a variety of forms as known to those of skill in the art (e.g., re-order buffers or the like). In this manner, the processor core 400 is transformed during execution of the code 413, at least in terms of the output generated by the decoder, the hardware registers and tables utilized by the register renaming logic 425, and any registers (not shown) modified by the execution logic 450.

Although not illustrated in FIG. 9, a processing element may include other elements on chip with the processor core 400. For example, a processing element may include memory control logic along with the processor core 400. The processing element may include I/O control logic and/or may include I/O control logic integrated with memory control logic. The processing element may also include one or more caches.

Figure 10:
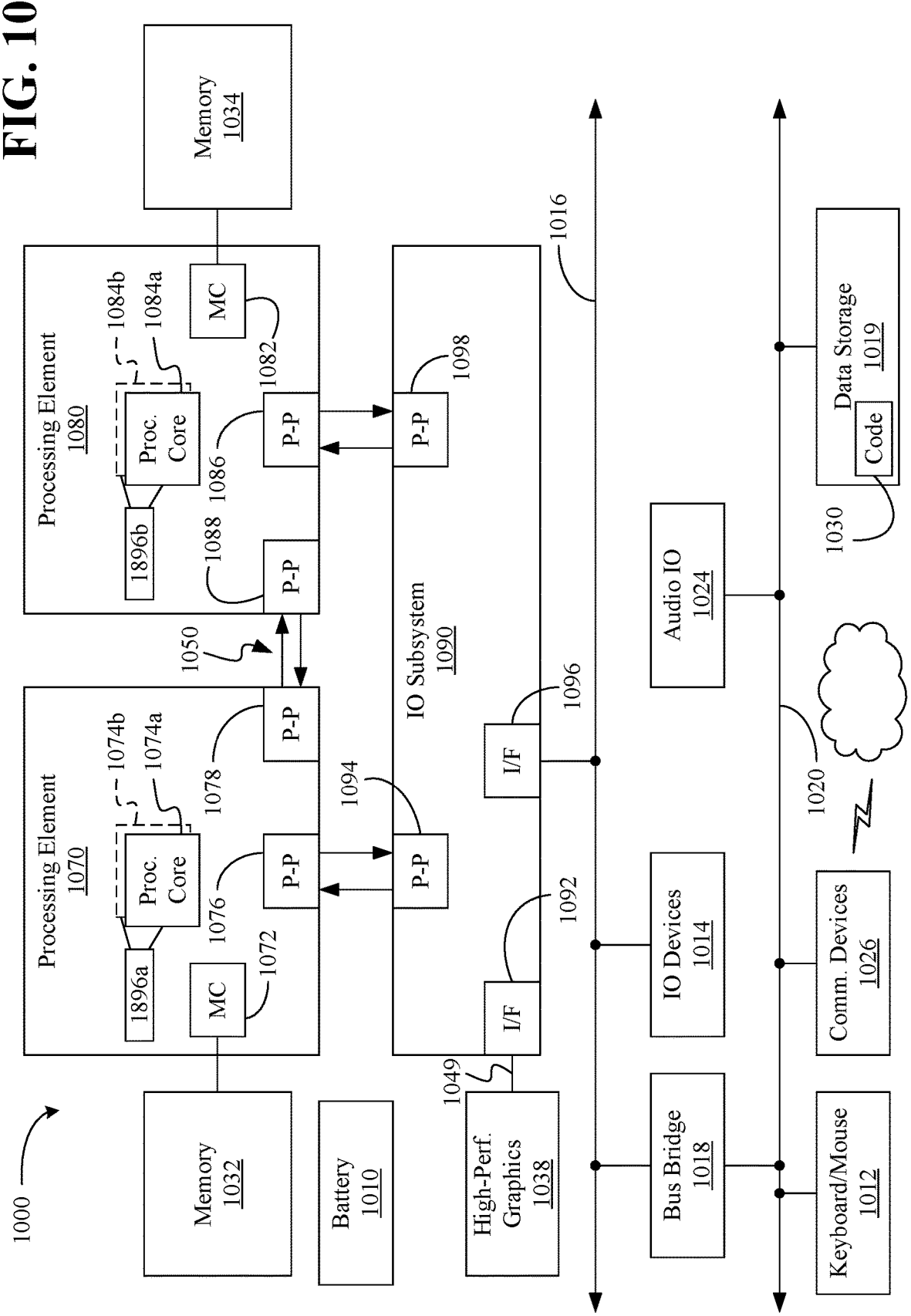
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 250 (FIG. 5) and/or the method 260 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing architecture comprising a default backend system, an accelerated backend system, a processor coupled to the default backend system and the accelerated backend system, and a memory coupled to the processor, wherein the memory includes a set of instructions, which when executed by the processor, cause the processor to identify telemetry data associated with an execution of a cluster of artificial intelligence (AI) operations on the accelerated backend system, wherein the telemetry data includes one or more of temperature classifier data, compute classifier data or failure data, and determine whether to send a current instance of the cluster of AI operations to the accelerated backend system or the default backend system based on the telemetry data, wherein the cluster is a pre-trained model subgraph.

Example 2 includes the computing system of Example 1, wherein the instructions, when executed, cause the processor to send the current instance to the default backend system if the telemetry data indicates that a performance of one or more previous instances of the cluster of AI operations on the default backend system is greater than a performance of one or more previous instances of the cluster of AI operations on the accelerated backend system.

Example 3 includes the computing system of any one of Examples 1 to 2, wherein the compute classifier data indicates a level of computational intensity corresponding to one or more previous instances of the cluster of AI operations on the accelerated backend system.

Example 4 includes the computing system of any one of Examples 1 to 2, wherein the temperature classifier data indicates a risk zone corresponding to one or more previous instances of the cluster of AI operations on the accelerated backend system, and wherein the instructions, when executed, cause the processor to send the current instance to the default backend system if the risk zone exceeds a threshold.

Example 5 includes the computing system of any one of Examples 1 to 2, wherein the failure data corresponds to one or more previous instances of the cluster of AI operations on the accelerated backend system, and wherein the instructions, when executed, cause the computing system to send the current instance to the default backend system if the failure data indicates one or more failures.

Example 6 includes a semiconductor apparatus comprising one or more substrates, and logic coupled to the one or more substrates, wherein the logic is implemented at least partly in one or more of configurable or fixed-functionality hardware, the logic to identify telemetry data associated with an execution of a cluster of artificial intelligence (AI) operations on an accelerated backend system, wherein the telemetry data includes one or more of temperature classifier data, compute classifier data or failure data, and determine whether to send a current instance of the cluster of AI operations to the accelerated backend system or a default backend system based on the telemetry data.

Example 7 includes the semiconductor apparatus of Example 6, wherein the logic is to send the current instance to the default backend system if the telemetry data indicates that a performance of one or more previous instances of the cluster of AI operations on the default backend system is greater than a performance of one or more previous instances of the cluster of AI operations on the accelerated backend system.

Example 8 includes the semiconductor apparatus of Example 6, wherein the compute classifier data indicates a level of computational intensity corresponding to one or more previous instances of the cluster of AI operations on the accelerated backend system.

Example 9 includes the semiconductor apparatus of Example 6, wherein the temperature classifier data indicates a risk zone corresponding to one or more previous instances of the cluster of AI operations on the accelerated backend system.

Example 10 includes the semiconductor apparatus of Example 9, wherein the logic is to send the current instance to the default backend system if the risk zone exceeds a threshold.

Example 11 includes the semiconductor apparatus of Example 6, wherein the failure data corresponds to one or more previous instances of the cluster of AI operations on the accelerated backend system.

Example 12 includes the semiconductor apparatus of Example 11, wherein the logic is to send the current instance to the default backend system if the failure data indicates one or more failures.

Example 13 includes the semiconductor apparatus of any one of Examples 6 to 12, wherein the cluster is a pre-trained model subgraph.

Example 14 includes at least one computer readable storage medium comprising a set of instructions, which when executed by a computing system, cause the computing system to identify telemetry data associated with an execution of a cluster of artificial intelligence (AI) operations on an accelerated backend system, wherein the telemetry data includes one or more of temperature classifier data, compute classifier data or failure data, and determine whether to send a current instance of the cluster of AI operations to the accelerated backend system or a default backend system based on the telemetry data, wherein the cluster is a pre-trained model subgraph.

Example 15 includes the at least one computer readable storage medium of Example 14, wherein the instructions, when executed, cause the computing system to send the current instance to the default backend system if the telemetry data indicates that a performance of one or more previous instances of the cluster of AI operations on the default backend system is greater than a performance of one or more previous instances of the cluster of AI operations on the accelerated backend system.

Example 16 includes the at least one computer readable storage medium of any one of Examples 14 to 15, wherein the compute classifier data indicates a level of computational intensity corresponding to one or more previous instances of the cluster of AI operations on the accelerated backend system.

Example 17 includes the at least one computer readable storage medium of any one of Examples 14 to 15, wherein the temperature classifier data indicates a risk zone corresponding to one or more previous instances of the cluster of AI operations on the accelerated backend system.

Example 18 includes the at least one computer readable storage medium of Example 17, wherein, when executed, the instructions cause the computing system to send the current instance to the default backend system if the risk zone exceeds a threshold.

Example 19 includes the at least one computer readable storage medium of any one of Examples 14 to 15, wherein the failure data corresponds to one or more previous instances of the cluster of AI operations on the accelerated backend system.

Example 20 includes the at least one computer readable storage medium of Example 19, wherein, when executed, the instructions cause the computing system to send the current instance to the default backend system if the failure data indicates one or more failures.

Example 21 includes a method of operating a performance-enhanced computing architecture, the method comprising identifying telemetry data associated with an execution of a cluster of artificial intelligence (AI) operations on an accelerated backend system, wherein the telemetry data includes one or more of temperature classifier data, compute classifier data or failure data, and determining whether to send a current instance of the cluster of AI operations to the accelerated backend system or a default backend system based on the telemetry data.

Example 22 includes the method of Example 21, further including sending the current instance to the default backend system if the telemetry data indicates that a performance of one or more previous instances of the cluster of AI operations on the default backend system is greater than a performance of one or more previous instances of the cluster of AI operations on the accelerated backend system.

Example 23 includes the method of Example 21, wherein the compute classifier data indicates a level of computational intensity corresponding to one or more previous instances of the cluster of AI operations on the accelerated backend system.

Example 24 includes the method of Example 21, wherein the temperature classifier data indicates a risk zone corresponding to one or more previous instances of the cluster of AI operations on the accelerated backend system, and wherein the method further includes sending the current instance to the default backend system if the risk zone exceeds a threshold.

Example 25 includes the method of Example 21, wherein the failure data corresponds to one or more previous instances of the cluster of AI operations on the accelerated backend system, and wherein the method further includes sending the current instance to the default backend system if the failure data indicates one or more failures.

Example 26 includes means for performing the method of any one of Examples 21 to 25.

Embodiments are applicable for use with all types of semiconductor integrated circuit ("IC") chips. Examples of these IC chips include but are not limited to processors, controllers, chip set components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing architecture comprising:
a default backend system;
an accelerated backend system;
a processor coupled to the default backend system and the accelerated backend system; and
a memory coupled to the processor, wherein the memory includes a set of instructions, which when executed by the processor, cause the processor to:

identify telemetry data associated with an execution of a cluster of artificial intelligence (AI) operations on the accelerated backend system, wherein the telemetry data includes one or more of temperature classifier data, compute classifier data or failure data, wherein the failure data corresponds to one or more previous instances of the cluster of AI operations on the accelerated backend system, and determine whether to send a current instance of the cluster of AI operations to the accelerated backend system or the default backend system based on the telemetry data, wherein the cluster is a pre-trained model subgraph;

wherein when the telemetry data includes failure data, the instructions, when executed, cause the processor to send the current instance to the default backend system if the failure data indicates one or more failures; and wherein the temperature classifier data indicates a risk zone corresponding to one or more previous instances of the cluster of AI operations on the accelerated backend system, and wherein the instructions, when executed, cause the processor to send the current instance to the default backend system when the risk zone exceeds a threshold.

2. The computing system of claim 1, wherein the instructions, when executed, cause the processor to send the current instance to the default backend system if the telemetry data indicates that a performance of one or more previous instances of the cluster of AI operations on the default backend system is greater than a performance of one or more previous instances of the cluster of AI operations on the accelerated backend system.

3. The computing system of claim 1, wherein the compute classifier data indicates a level of computational intensity corresponding to one or more previous instances of the cluster of AI operations on the accelerated backend system.

4. The computing system of claim 1, wherein the temperature classifier data relates to a risk based on temperature limits of an accelerator in the accelerated backend system, and wherein the failure data relates to previous runtime execution failures for the cluster of AI operations.

5. A semiconductor apparatus comprising:

one or more substrates; and logic coupled to the one or more substrates, wherein the logic is implemented at least partly in one or more of configurable or fixed-functionality hardware, the logic to:

identify telemetry data associated with an execution of a cluster of artificial intelligence (AI) operations on an accelerated backend system, wherein the telemetry data includes one or more of temperature classifier data, compute classifier data or failure data, wherein the failure data corresponds to one or more previous instances of the cluster of AI operations on the accelerated backend system; and determine whether to send a current instance of the cluster of AI operations to the accelerated backend system or a default backend system based on the telemetry data, wherein the cluster is a pre-trained model subgraph;

wherein when the telemetry data includes failure data, the logic is to send the current instance to the default backend system if the failure data indicates one or more failures; and wherein the temperature classifier data indicates a risk zone corresponding to one or more previous instances of the cluster of AI operations on the accelerated backend system, and wherein logic is to send the current instance to the default backend system when the risk zone exceeds a threshold.

6. The semiconductor apparatus of claim 5, wherein the logic is to send the current instance to the default backend system if the telemetry data indicates that a performance of one or more previous instances of the cluster of AI operations on the default backend system is greater than a performance of one or more previous instances of the cluster of AI operations on the accelerated backend system.

7. The semiconductor apparatus of claim 5, wherein the compute classifier data indicates a level of computational intensity corresponding to one or more previous instances of the cluster of AI operations on the accelerated backend system.

8. The semiconductor apparatus of claim 5, wherein the temperature classifier data relates to a risk based on temperature limits of an accelerator in the accelerated backend system, and wherein the failure data relates to previous runtime execution failures for the cluster of AI operations.

9. At least one non-transitory computer readable storage medium comprising a set of instructions, which when executed by a computing system, cause the computing system to:

identify telemetry data associated with an execution of a cluster of artificial intelligence (AI) operations on an accelerated backend system, wherein the telemetry data includes one or more of temperature classifier data, compute classifier data or failure data, wherein the failure data corresponds to one or more previous instances of the cluster of AI operations on the accelerated backend system; and determine whether to send a current instance of the cluster of AI operations to the accelerated backend system or a default backend system based on the telemetry data, wherein the cluster is a pre-trained model subgraph;

wherein when the telemetry data includes failure data, the instructions, when executed, cause the computing system to send the current instance to the default backend system if the failure data indicates one or more failures; and wherein the temperature classifier data indicates a risk zone corresponding to one or more previous instances of the cluster of AI operations on the accelerated backend system, and wherein the instructions, when executed, cause the computing system to send the current instance to the default backend system when the risk zone exceeds a threshold.

10. The at least one non-transitory computer readable storage medium of claim 9, wherein the instructions, when executed, cause the computing system to send the current instance to the default backend system if the telemetry data indicates that a performance of one or more previous instances of the cluster of AI operations on the default backend system is greater than a performance of one or more previous instances of the cluster of AI operations on the accelerated backend system.

11. The at least one non-transitory computer readable storage medium of claim 9, wherein the compute classifier data indicates a level of computational intensity corresponding to one or more previous instances of the cluster of AI operations on the accelerated backend system.

12. The at least one non-transitory computer readable storage medium of claim 9, wherein the temperature classifier data relates to a risk based on temperature limits of an accelerator in the accelerated backend system, and wherein the failure data relates to previous runtime execution failures for the cluster of AI operations.

13. A method comprising:
    identifying telemetry data associated with an execution of a cluster of artificial intelligence (AI) operations on an accelerated backend system, wherein the telemetry data includes one or more of temperature classifier data, compute classifier data or failure data, wherein the failure data corresponds to one or more previous instances of the cluster of AI operations on the accelerated backend system; and
    determining whether to send a current instance of the cluster of AI operations to the accelerated backend system or a default backend system based on the telemetry data, wherein the cluster is a pre-trained model subgraph;
    wherein when the telemetry data includes failure data, the method further includes sending the current instance to the default backend system if the failure data indicates one or more failures;
    wherein the temperature classifier data indicates a risk zone corresponding to one or more previous instances of the cluster of AI operations on the accelerated backend system, and wherein the method further includes sending the current instance to the default backend system when the risk zone exceeds a threshold.

14. The method of claim 13, further including sending the current instance to the default backend system if the telemetry data indicates that a performance of one or more previous instances of the cluster of AI operations on the default backend system is greater than a performance of one or more previous instances of the cluster of AI operations on the accelerated backend system.

15. The method of claim 13, wherein the compute classifier data indicates a level of computational intensity corresponding to one or more previous instances of the cluster of AI operations on the accelerated backend system.

16. The method of claim 13, wherein the temperature classifier data relates to a risk based on temperature limits of an accelerator in the accelerated backend system, and wherein the failure data relates to previous runtime execution failures for the cluster of AI operations.

* * * * *